(12) United States Patent
Forstner et al.

(10) Patent No.: US 9,547,069 B2
(45) Date of Patent: Jan. 17, 2017

(54) AUTOMOTIVE RADAR TRANSMITTER ARCHITECTURE

(71) Applicant: Infineon Technologies AG, Neubiberg (DE)

(72) Inventors: Johann Peter Forstner, Steinhoering (DE); Udo Gerlach, Munich (DE)

(73) Assignee: Infineon Technologies AG, Neubiberg (DE)

( * ) Notice: Subject to any disclaimer, the term of this patent is extended or adjusted under 35 U.S.C. 154(b) by 246 days.

(21) Appl. No.: 14/334,117

(22) Filed: Jul. 17, 2014

(65) Prior Publication Data

US 2015/0316641 A1    Nov. 5, 2015

Related U.S. Application Data

(63) Continuation of application No. 13/269,690, filed on Oct. 10, 2011, now Pat. No. 8,791,854.

(51) Int. Cl.
*G01S 7/02* (2006.01)
*H01Q 3/26* (2006.01)
(Continued)

(52) U.S. Cl.
CPC ............... *G01S 7/02* (2013.01); *G01S 7/032* (2013.01); *G01S 13/931* (2013.01);
(Continued)

(58) Field of Classification Search
CPC .......... G01S 7/02; G01S 13/931; G01S 7/032; G01S 2013/9321; G01S 2013/0245; G01S 13/584; G01S 2007/358; G01S 7/03; H04B 7/0617; H04B 7/0408; H04B 7/086; H04B 7/0413; H01Q 21/06; H01Q 3/24; H01Q 1/3233; H01Q 3/26; H01Q 3/30
(Continued)

(56) References Cited

U.S. PATENT DOCUMENTS 4,952,940 A * 8/1990 Kuepfer ................ G01S 13/288
                                                        342/174
6,054,948 A    4/2000 Dean
(Continued)

FOREIGN PATENT DOCUMENTS

EP    1684087 A2    7/2006

*Primary Examiner* — John B Sotomayor
(74) *Attorney, Agent, or Firm* — Eschweiler & Associates, LLC

(57) ABSTRACT

One embodiment of the present invention relates to a transmitter within a single integrated chip substrate, which is capable of continuous beam steering of a transmitted radar beam as well as an option to change the physical position of the origin of the transmit radar beam. The transmitter has a signal generator that generates an RF signal. The RF signal is provided to a plurality of independent transmission chains, which contain independently operated vector modulators configured to introduce an individual phase adjustment to the high frequency input signal to generate separate RF output signals. A control unit is configured to selectively activate a subset of (e.g., two or more) the independent transmission chains. By activating the subset of independent transmission chains to generate RF output signals with separate phases, a beam steering functionality is enabled. Furthermore, the subset defines a changeable position of the transmitted radar beam.

19 Claims, 5 Drawing Sheets

(51) Int. Cl.
*H01Q 1/32* (2006.01)
*G01S 7/03* (2006.01)
*G01S 13/93* (2006.01)
*H01Q 3/24* (2006.01)
*H01Q 21/06* (2006.01)
*H04B 7/06* (2006.01)
*G01S 13/58* (2006.01)
*G01S 13/02* (2006.01)
*G01S 7/35* (2006.01)

(52) U.S. Cl.
CPC ............. *H01Q 1/3233* (2013.01); *H01Q 3/24* (2013.01); *H01Q 3/26* (2013.01); *H01Q 21/06* (2013.01); *H04B 7/0617* (2013.01); *G01S 13/584* (2013.01); *G01S 2007/358* (2013.01); *G01S 2013/0245* (2013.01); *G01S 2013/9321* (2013.01)

(58) Field of Classification Search
USPC .................. 342/175, 81, 154, 157–158, 368, 342/371–374
See application file for complete search history.

(56) References Cited

U.S. PATENT DOCUMENTS

| | | | |
|---|---|---|---|
| 6,054,949 A | 4/2000 | Grassmann | |
| 6,094,165 A | 7/2000 | Smith | |
| 6,894,657 B2 | 5/2005 | Carey | |
| 7,432,856 B1* | 10/2008 | Hornbostel | G01S 1/028 342/169 |
| 7,859,459 B2* | 12/2010 | McCune, Jr. | H01Q 3/267 342/372 |
| 7,944,390 B2 | 5/2011 | Krieger et al. | |
| 8,184,052 B1* | 5/2012 | Wu | H01Q 3/2605 342/368 |
| 8,203,483 B2 | 6/2012 | Richards | |
| 2004/0183719 A1 | 9/2004 | Natsume et al. | |
| 2004/0207552 A1 | 10/2004 | Isaji | |
| 2004/0246168 A1 | 12/2004 | Isaji | |
| 2007/0052581 A1 | 3/2007 | Shima | |
| 2008/0088499 A1 | 4/2008 | Bonthron et al. | |
| 2008/0278370 A1 | 11/2008 | Lachner et al. | |
| 2010/0201572 A1* | 8/2010 | Lackey | H01Q 3/2617 342/373 |
| 2010/0283665 A1* | 11/2010 | Bashir | H04B 15/02 342/174 |
| 2010/0328157 A1 | 12/2010 | Culkin et al. | |
| 2011/0109507 A1 | 5/2011 | Warnick | |
| 2012/0274513 A1* | 11/2012 | Le Bars | H04B 7/022 342/368 |
| 2013/0016003 A1 | 1/2013 | Stirling-Gallacher et al. | |
| 2013/0088383 A1* | 4/2013 | Forstner | H01Q 1/3233 342/175 |

* cited by examiner

US 9,547,069 B2

AUTOMOTIVE RADAR TRANSMITTER ARCHITECTURE

REFERENCE TO RELATED APPLICATION

This application is a continuation of U.S. application Ser. No. 13/269,690 filed on Oct. 10, 2011.

BACKGROUND OF THE INVENTION

Radar systems are becoming increasingly common in modern motor vehicles. Radar systems can detect the location of objects around a vehicle and allow the vehicle to respond accordingly. For example, autonomous cruise control (ACC) systems utilize a radar system to detect the location and/or velocity of objects around an automobile. The radar system provides signals corresponding to the detected location and/or velocity to a digital signal processor (DSP), which in response to the signals, automatically adjusts the automobile's speed in order to maintain a safe distance (e.g., if an object is detected in front of the automobile, the DSP sends a signal to the engine or braking system to decelerate).

Radar systems often operate according to a phase monopulse azimuth detection method, which allows for detection of an object's angle and distance relative to a vehicle. The phase monopulse azimuth detection method utilizes two or more receiving antennas to determine the angular position of an object by calculating the phase difference between signals received at each antenna. To distinguish between objects that are at a same distance, but at different angular positions relative to the radar system, digital beam forming (DBF) may be used to generate a radar signal that extends over a small angle.

Typically, DBF radar transmitters comprise a transmission chip configured to generate a radio frequency (RF) signal. The RF signal is provided from the transmission chip to a radar front end for transmission. The front end has a phase shift network, which routes the RF signal through cables of varying length, before the signal is provided to two or more of a plurality of antennas. The frequencies that most radar systems operate at are sufficiently high (e.g., 24 GHz) such that the radar front end cannot be successfully implemented in a same bipolar silicon technology that is used for the transmission chip. Instead, the radar front end is usually implemented as separate monolithic microwave integrated circuits (MMIC) comprising gallium arsenide (GaAs) high electron mobility transistors, for example.

DETAILED DESCRIPTION OF THE INVENTION

Figure 1:
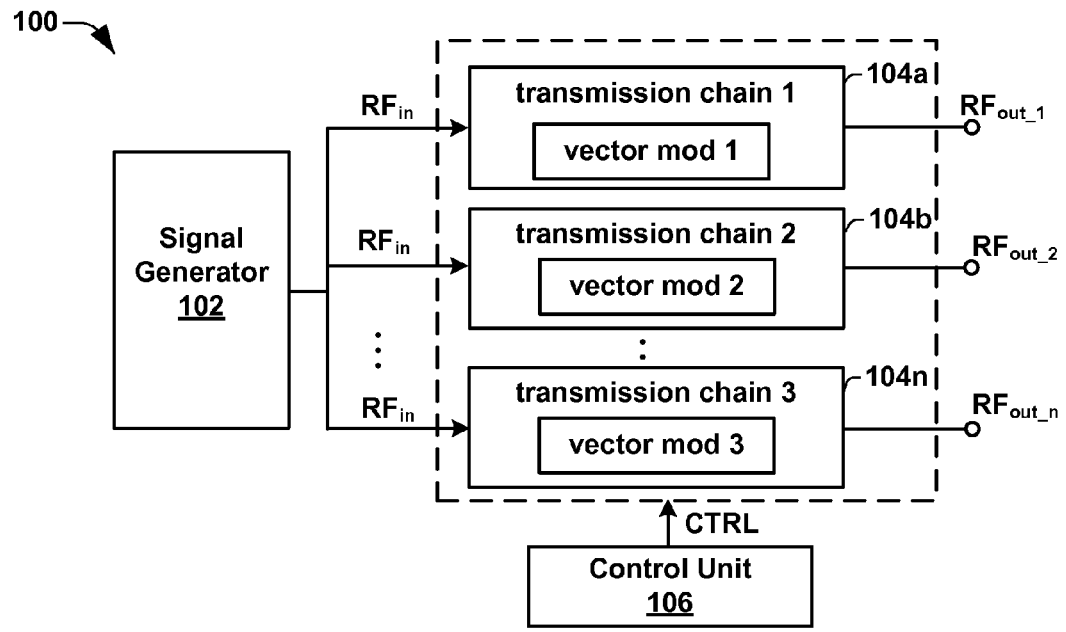
FIG. 1 illustrates a block diagram of a first embodiment of a radar transmitter having a plurality of independent transmission chains that can be selectively activated and deactivated.

The present invention will now be described with reference to the attached drawing figures, wherein like reference numerals are used to refer to like elements throughout, and wherein the illustrated structures and devices are not necessarily drawn to scale.

Some aspects of the present disclosure provide for a digital beam forming (DBF) radar transmitter comprised within a single integrated chip substrate, which is capable of continuous beam steering of a transmitted radar beam as well as changing the physical position of the origin of the transmitted radar beam. The DBF radar transmitter comprises a signal generator configured to generate a high frequency (e.g., radio frequency) input signal. The high frequency input signal is provided as an input to a plurality of independent transmission chains, which contain independently operated vector modulators (e.g., having IQ mixers) that are configured to introduce an individual phase adjustment to the high frequency input signal to generate separate RF output signals. A control unit is configured to selectively activate a subset of (e.g., two or more) the independent transmission chains. By activating the subset of independent transmission chains to generate RF output signals with separate phases, a beam steering functionality is enabled. Furthermore, the subset defines a changeable position of the transmitted radar beam.

FIG. 1 illustrates a block diagram of a first embodiment of a radar transmitter 100 (e.g., a DBF radar transmitter) having a plurality of independent transmission chains.

The radar transmitter 100 comprises a signal generator 102 having an output node that is coupled to a plurality of transmission chains 104a-104n. The signal generator 102 is configured to generate a radio frequency (RF) input signal $RF_{in}$, which is provided as an input to each of the plurality of transmission chains 104a-104n.

Each of the transmission chains 104a-104n contains a vector modulator configured to vary the amplitude and/or phase of the RF input signal $RF_{in}$ independent of the other transmission chains (i.e., to introduce an individual amplitude and/or phase adjustment to the RF input signal) before providing the signal as an RF output signal. For example, a first transmission chain 104a comprises a first vector modulator that introduces a first amplitude and/or a first phase adjustment into the RF input signal $RF_{in}$ to generate a first RF output signal $RF_{out1}$, while a second transmission chain 104b comprises a second vector modulator that introduces a second amplitude adjustment (different than the first amplitude adjustment) and/or a second phase adjustment (different than the first phase adjustment) into the RF input signal $RF_{in}$ to generate a second RF output signal $RF_{out2}$.

The radar transmitter 100 further comprises a control unit 106. The control unit 106 is configured to selectively activate a subset of the plurality of transmission chains to concurrently operate to generate RF output signals, while the remaining deactivated transmission chains do not generate RF output signals. When activated, a transmission chain outputs an RF output signal having a particular phase and/or amplitude controlled by the vector modulator within the transmission chain. When deactivated, the transmission chain does not output an RF output signal (e.g., outputs no RF output signal or an RF output signal having a substantially zero amplitude). In one embodiment, the control unit 106 may be further configured to control operation of the vector modulators comprised within each transmission chain (e.g., to define the phase and/or amplitude adjustment provided by a vector modulator).

In one embodiment, the subset of the plurality of transmission chains comprises two or more transmission chains. Since each transmission chain generates a separate output signal, the radar transmitter can operate the individual vector modulators to separately vary the phase of the RF output signals. By concurrently operating two or more of the transmission chains (e.g., 104a and 104b, 104b and 104n, 104a and 104n, etc.) to generate RF output signals with specific phases, which are superimposed upon each other (i.e., to constructively interfere at the location of the beam and to destructively interfere in other locations), a beam steering functionality is enabled in the radar transmitter 100 (e.g., that can steer the transmitted antenna beam in different directions, from −90° to +90°).

Furthermore, in one embodiment, wherein each RF output signal is provided to a separate antenna, a position of the transmitted radar beam origin is defined by the location of activated transmission chains. For example, selectively activating a first subset of the plurality of independent transmission chains provides a first location of the origin of the transmitted radar beam, while selectively activating a second subset of the plurality of independent transmission chains provides a second location of the origin of the transmitted radar beam, which is different than the first location. Therefore, the selective activation and deactivation of the transmission chains allows for the location of the origin of the transmitted radar beam to be varied.

Accordingly, the radar transmitter 100 enables the selective operation of transmitter chains containing vector modulators to enable both control of a transmitted radar beam origin position and a beam steering functionality, without utilizing high speed switches implemented as separate monolithic microwave integrated circuits (MMIC).

Figure 2:
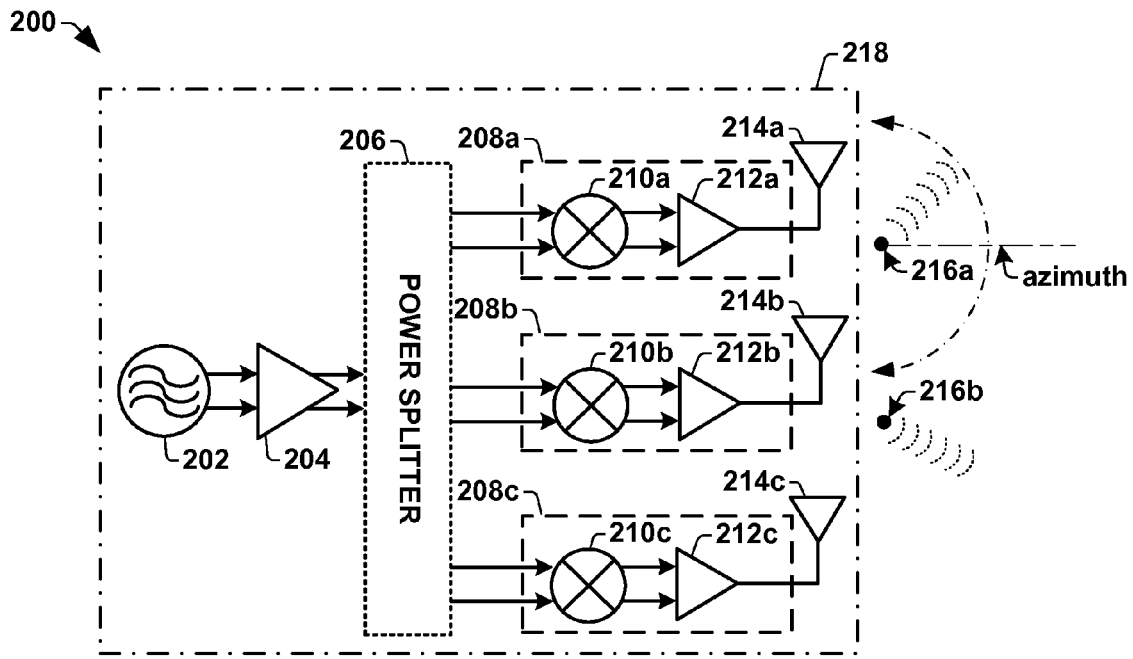
FIG. 2 illustrates a block diagram of an alternative embodiment of a radar transmitter having a plurality of independent transmission chains, respectively containing a vector modulator comprising one or more IQ mixers.

FIG. 2 illustrates a block diagram of a more detailed embodiment of a radar transmitter 200.

As illustrated in FIG. 2, the radar transmitter 200 comprises a signal generator 202 having a single oscillator (e.g., a voltage controlled oscillator) configured to generate a radio frequency (RF) input signal that is provided to a buffer amplifier 204 configured to amplify the RF input signal. In one embodiment, the buffer amplifier 204 amplifies the RF input signal before providing it to a power splitter 206 that splits the received RF input signal and outputs the split RF input signal to a plurality of independent transmission chains 208a-208c. In an alternative embodiment, the buffer amplifier 204 amplifies the RF input signal before providing it directly to the independent transmission chains 208a-208c.

Each transmission chain 208 contains a vector modulator having one or more IQ mixers 210 and a power amplifier 212. When a transmission chain is activated, one or more IQ mixers 210 within the transmission chain are configured to receive the RF input signal and to introduce an amplitude and/or phase adjustment to the RF input signal. Since each transmission chain operates independent of the other transmission chains, each IQ mixer 210 can introduce a different phase and/or amplitude change to the RF input signal $RF_{in}$. The output of different phased RF output signals are provided to different antennas 214 (e.g., bipolar antennas), thereby enabling a beam steering functionality (e.g., by continuously varying the phase of the RF output signals, the one or more IQ mixers 210 can cause the transmitted radar beam to sweep over a range of +90°/−90° from the azimuth). For example, if the first and second transmission chains are activated and the third transmission chain is deactivated, when the phases of the RF output signal transmitted from antennas 214a and 214b are the same, the transmitted antenna beam will propagate along the azimuth, while when the phase of the RF output signal transmitted from antennas 214a and 214b are different, the transmitted antenna beam will be steered to an angle away from the azimuth.

The radar transmitter 200 is further configured to provide for a change of the location of the transmitter radar beam origin 216 by selectively activating and deactivating a subset of the plurality of transmission chains. For example, in one embodiment, a subset of the plurality of transmission chains comprising two independent transmission chains is activated to concurrently generate a transmitted radar beam. The subset may comprise a first transmission chain 208a and a second transmission chain 208b, which are selectively activated to provide a first location of the origin 216a of the transmitted radar beam. Alternatively, the subset may comprise a second transmission chain 208b and a third transmission chain 208c, which are selectively activated to provide a second location of the origin 216b of the transmitted radar beam. In alternative embodiments, the subset may comprise different combinations of active transmission chains. Changing the position of the origin of the transmitted radar beam improves performance of the DBF radar transmitter (e.g., allows for twice the amount of received RF channel data to be synthesized than is physically implemented).

In one embodiment, the radar transmitter 200 may be comprised within a single integrated chip substrate 218 (e.g., a silicon substrate) or a single semiconductor technology (e.g., a SiGe or CMOS chip). In contrast to prior art transmitters, which may couple an RF signal generated by a silicon based transmission integrated chip to antennas using switches with a low transmission loss that are comprised on a different integrated chip (e.g., comprising GaAs, GaN, etc.), the disclosed transmitter radar may be comprised within a single integrated chip. This is because the disclosed radar transmitter operates without using low loss switches. Rather the disclosed radar transmitter changes the location of the origin of the radar transmitter beam by selectively activating or deactivating the transmission chains. Implementation of the transmitter radar in a single integrated chip provides for a cost reduction over multichip assemblies.

It will be appreciated that the transmission chains, contained within the transmitter radar provided herein, may be selectively activated or deactivated according to a variety of techniques known to one of ordinary skill in the art. For example, in one embodiment, a transmission chain may be deactivated by operating a power amplifier in the transmission chain to produce an output signal having an amplitude of substantially zero. In another embodiment, the transmission chains may be selectively activated or deactivated by decoupling a power supplied from each transmission chain. In yet another embodiment, the transmission chains may be selectively activated or deactivated by either not applying a control signal to a mixer (e.g., not providing a control signal for mixer 210a to mix with the RF input signal) or by setting the control signal to have an amplitude of zero (e.g., providing a control signal with an amplitude of zero to mixer). In such an embodiment, the output of the mixer is zero, effectively turning off the transmission chain.

Figure 3:
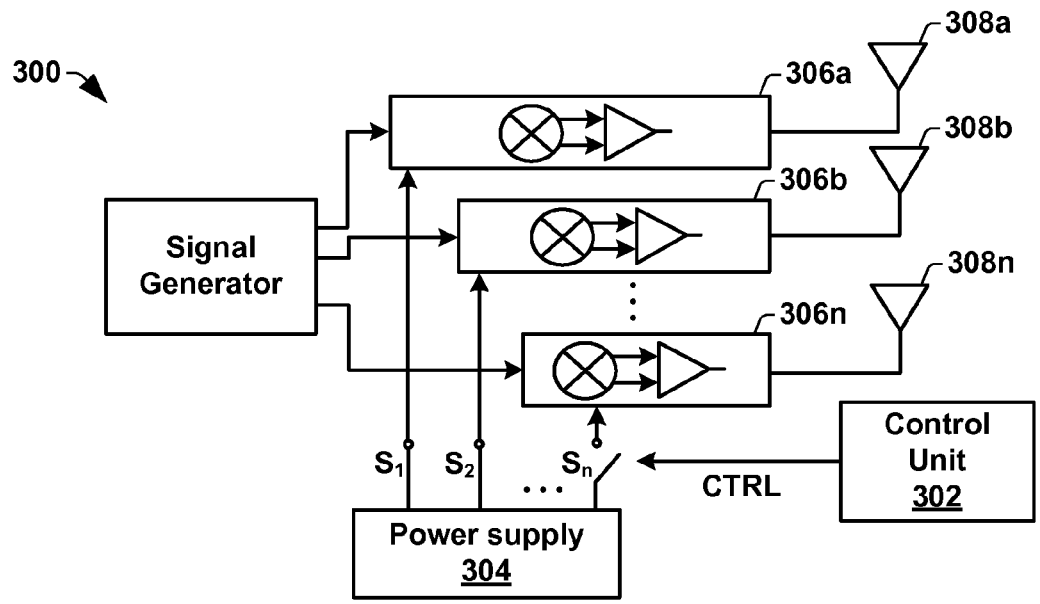
FIG. 3 illustrates a block diagram of another embodiment of a radar transmitter having a plurality of independent transmission chains selectively operated by a control unit.

FIG. 3 illustrates a DBF transmitter radar 300 comprising a control unit 302 that is configured to generate control signals that selectively activate and deactivate a plurality of transmission chains. The control signals CTRL selectively operate a plurality of switching elements $S_1$-$S_n$, which are configured to provide power from a power supply 304 to one or more of the transmission chain 306a-306n.

In one embodiment, transmission chains 306a-306n are activated and deactivated by selectively operating switching elements $S_1$-$S_n$ to connect the power supply 304 to a bias terminal of power amplifiers within respective transmission chains. For example, the control unit 302 may deactivate the first transmission chain 306a by providing a control signal CTRL that opens a first switching element $S_1$. Opening the first switching element $S_1$ cuts off a connection between the power supply 304 and the first transmission chain 306a, thereby turning off the bias voltage of the power amplifier that feeds the first transmission antenna 308a. The control unit 302 may activate the first transmission chain 306a by providing a control signal CTRL that closes the first switching element $S_1$. Closing the first switching element $S_1$ forms an electrical connection between the power supply 304 and the first transmission chain 306a, thereby turning on the bias voltage of the power amplifier that feeds the first transmission antenna 308a.

As illustrated in FIG. 3, the first switching element $S_1$ and the second switching element $S_2$ are closed, activating the first transmission chain 306a and the second transmission chain 306b. Furthermore, the third switching element $S_3$ is open, deactivating the third transmission chain 306c.

Figure 4:
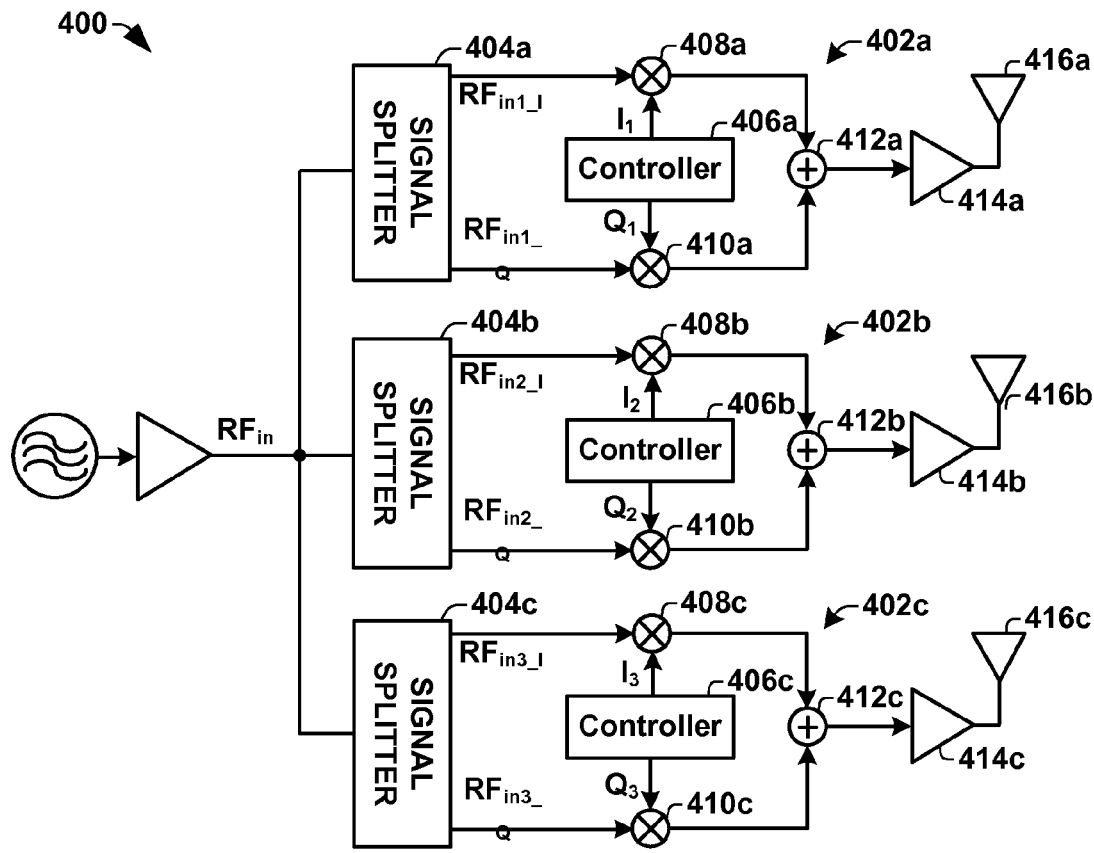
FIG. 4 illustrates a block diagram of a more detailed embodiment of a radar transmitter having a plurality of independent transmission chains respectively containing a vector modulator comprising IQ mixers.

FIG. 4 illustrates a block diagram of a more detailed embodiment of a radar transmitter 400 having a plurality of independent transmission chains 402.

The radar transmitter 400 comprises a signal generator configured to the generate and provide an RF input signal $RF_{in}$ to each of the transmission chains 402. Each transmission chain 402x (where x=1, 2, or 3) contains a signal splitter 404x configured to receive the RF input signal $RF_{in}$. The signal splitter 404x is configured to split the RF input signal $RF_{in}$ into two signals, an in-phase RF input signal $RF_{inx\_I}$ and a quadrature phase RF input signal $RF_{inx\_Q}$, having a 90° phase shift therebetween. For example, the first transmission chain contains a first signal splitter 404a. The first signal splitter 404a is configured to generate an in-phase signal $RF_{in1\_I}$ and a quadrature phase signal $RF_{in1\_Q}$, wherein the in-phase $RF_{in1\_I}$ has a 90° phase shift with respect to the quadrature phase signal $RF_{in1\_Q}$.

The in-phase signal $RF_{inx\_I}$ and the quadrature signal $RF_{inx\_Q}$ are multiplied, by an in-phase mixer 408x and a quadrature phase mixer 410x respectively, with control signals $I_x$ and $Q_x$ generated by a controller 406x (e.g., comprising local oscillator configured to generate control signals having a 90° phase shift, which are provided to first and second mixers, or comprising a digital-to-analog that is controlled by an SPI interface), to generate a modulated in-phase signal and a modulated quadrature phase signal. The modulated in-phase signal is output from the in-phase mixer 408x to adder 412x and the modulated quadrature phase signal is output from the quadrature phase mixer 410x to the adder 412x. The adder 412x recombines the modulated in-phase and quadrature phase signals to generate an RF output signal that is provided to a power amplifier 414x before being transmitted from an antenna 416x.

For example, the in-phase signal $RF_{in1\_I}$ is provided to a first IQ mixer 408a. The first IQ mixer 408a is configured to mix the in-phase signal $RF_{in1\_I}$ with an in-phase control signal $I_x$ generated by the first controller 406a. The output of the first IQ mixer 408a is provided as an in-phase modulated signal to adder 412a. The quadrature phase signal $RF_{in1\_Q}$ is provided to a second IQ mixer 408b. The second mixer 408b is configured to mix the quadrature phase signal $RF_{in1\_Q}$ with a quadrature control signal generated by the controller 406a. The output of the second IQ mixer is provided as a quadrature phase modulated signal to the adder 412a. The modulated in-phase and quadrature phase output signals are re-combined by adder 412a and then provided to a power amplifier 414a. The power amplifier 414a is configured to increase the amplitude of the RF output signal before it is provided to an antenna 416a for transmission.

It will be appreciated that the IQ mixers 408 and 410 may be operated in to introduce a phase adjustment, an amplitude adjustment, or a phase adjustment and an amplitude adjustment into the RF input signal. For example, in one embodiment, the mixers 408 and 410 may be operated to introduce a phase adjustment into the RF input signal, while the amplifier 414 may be configured to introduce an amplitude adjustment to the phase shifted RF input signal. In another embodiment, the mixers 408 and 410 may be operated to introduce a phase adjustment and an amplitude adjustment into the RF input signal, while the amplifier 414 may be configured to introduce a further amplitude adjustment to the phase shifted RF input signal.

By changing the phase and amplitude of the control signals $I_x$ and $Q_x$, the phase and amplitude of the RF output signal can be varied, thereby providing for an amplitude and phase control based upon the control signals $I_x$ and $Q_x$.

For example, FIGS. 5a-5d illustrate polar diagrams of the output signal of the transmission chain (e.g., output from adder 412a) illustrated in FIG. 4, which has a variable amplitude $A_x$ and a variable phase $_x$ (which are dependent upon the value of the control signals $I_x$ and $Q_x$). The polar diagrams illustrate how the value of the control signals generated by a controller 406 may be varied to change the amplitude and phase of an output signal. In particular, the polar diagrams illustrate that varying the value of the $I_x$ and $Q_x$ control signals generated by the controller 406 change the value of the amplitude of the RF output signal since $A_x = I_x^2 + Q_x^2$ and change the value of the phase of the RF output signal since, $_x = \tan^{-1}(Q_x/I_x)$ Referring to FIG. 5a, a polar diagram 500 illustrates a first controller output configuration, wherein the controller outputs a first in-phase control signal having a value of $I_{x,1}$ (where x=1, 2, or 3) and a quadrature phase control signal having a value of $Q_1$, which is equal to value of $I_{x,1}$. The resulting output signal has an amplitude of $A_1 = I_{x,1}^2 + Q_{x,1}^2$ and a phase of $_1 = \tan^{-1}(Q_{x,1}/I_{x,1})$.

Figure 5A:
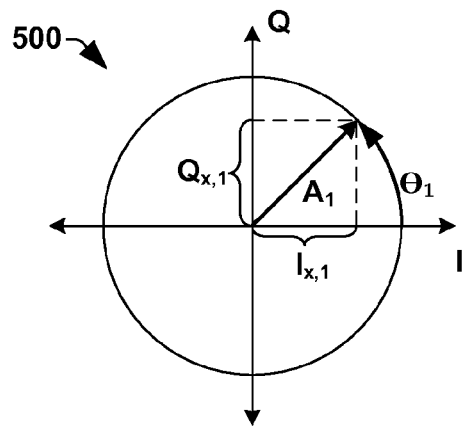
FIGS. 5A-5D illustrate polar diagrams of the output signal of a radar transmitter transmission chain.
Figure 5B:
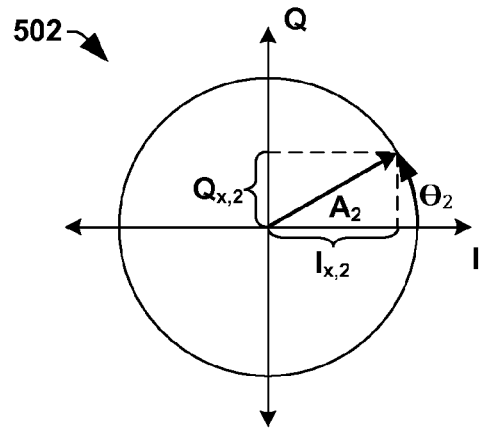

Referring to FIG. 5b, a polar diagram 502 illustrates a first controller output configuration, wherein the controller may be operated to output an in phase control signal having a value of $I_{x,2}$ ($I_{x,2}$ is greater than $I_1$) and a quadrature phase control signal having a value of $Q_{x,2}$ ($Q_{x,2}$ is less than $I_{x,1}$). The resulting output signal has an amplitude of $A_2 = I_{x,2}^2 + Q_{x,2}^2$, which is equal to $A_1$, and a phase of $_2 = \tan^{-1}(Q_{x,2}/I_{x,2})$, which is less than $_1$.

Figure 5C:
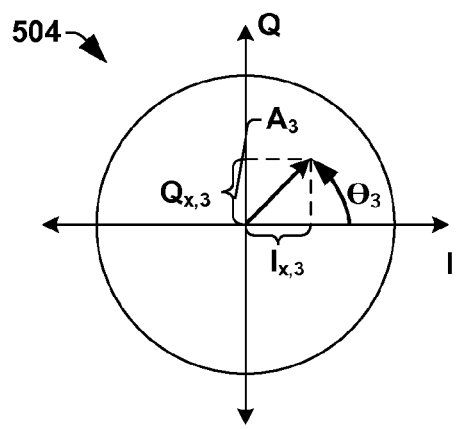

Referring to FIG. 5c, a polar diagram 504 illustrates a first controller output configuration, wherein the controller may be operated to output an in phase control signal having a value of $I_{x,3}$ ($I_{x,3}$ is less than $I_{x,1}$) and a quadrature phase control signal having a value of $Q_{x,3}$ ($Q_{x,3}$ is less than $I_{x,3}$). The resulting output signal has an amplitude of $A_3 = I_{x,3}^2 + Q_{x,3}^2$, which is less than $A_3$, and a phase of $_3 = \tan^{-1}(Q_{x,3}/I_{x,3})$, which is substantially equal to $_1$.

Figure 5D:
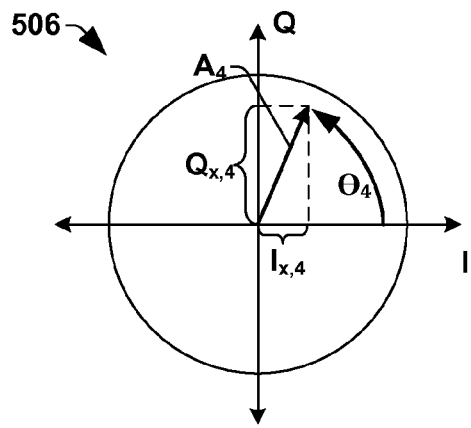

Referring to FIG. 5d, a polar diagram 506 illustrates a first controller output configuration, wherein the controller may be operated to output an in phase control signal having a value of $I_{x,4}$ ($I_{x,4}$ is less than $I_1$) and a quadrature phase control signal having a value of $Q_{x,4}$ ($Q_{x,4}$ $Q_{x,4}$ is greater than $I_{x,1}$). The resulting output signal has an amplitude of $A_4=I_{x,4}^2+Q_{x,4}^2$ that is less than to $A_1$ and a phase of $_4=\tan^{-1}(Q_{x,4}/I_{x,4})$ that is greater than $_4$.

Figure 6A:
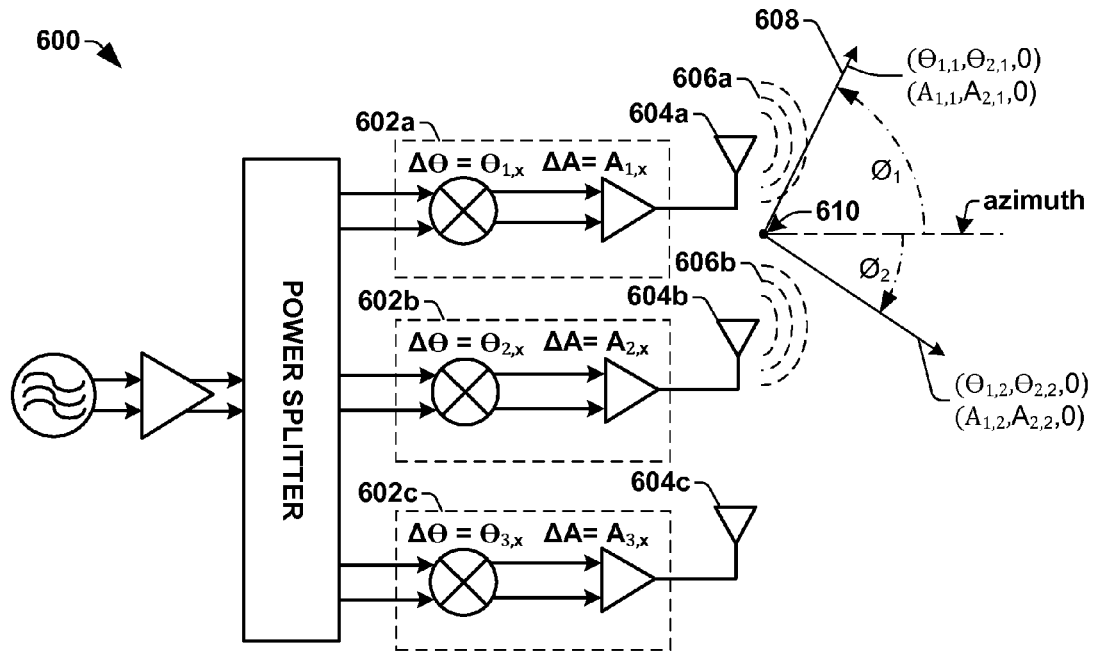
FIGS. 6A and 6B illustrate block diagrams of a radar transmitter having independent transmission chains selectively operated in different subset configurations.
Figure 6B:
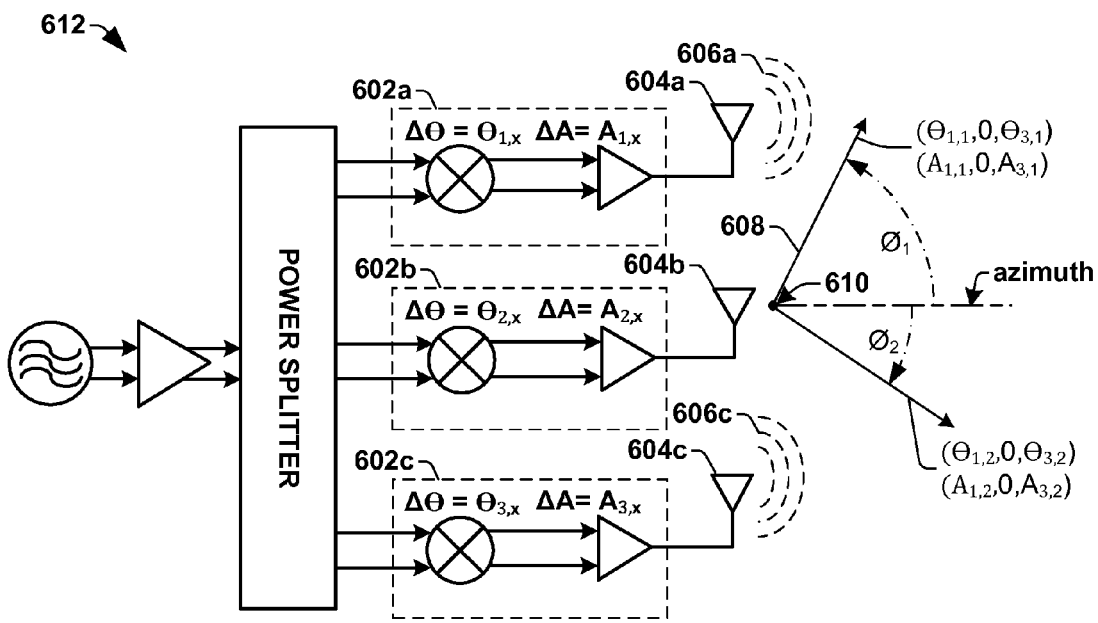

FIGS. 6a-6b illustrate a radar transmitter 700 (e.g., a DBF radar transmitter) operating according to different active transmission chain subset configurations (i.e., having different subsets of the plurality of transmission chains activated and deactivated). It will be appreciated that the configurations shown are non-limiting configurations and that a radar transmitter as provided herein may be operated according to alternative configurations.

In FIGS. 6a-6b the transmission chains 602 are configured to operate independently of one another, such that the first transmission chain 602a is configured to generate an output signal having an amplitude of $A_{1,t}$ and a phase of $_{1,t}$ while the second transmission chain 602b is configured to generate an output signal having an amplitude of $A_{2,t}$ and a phase of $_{2,t}$ and the third transmission chain 602c is configured to generate an output signal having an amplitude of $A_{3,t}$ and a phase of $_{3,t}$, where t is a time period.

Referring to FIG. 6a, the radar transmitter 600 (e.g., DBF radar transmitter) is operated according to a first active transmission chain subset configuration wherein the first transmission chain 602a and second transmission chain 602b are activated, while the third transmission chain 602c is deactivated. The first and second transmission chains output signals 606a and 606b from the first and second antennas 604a and 604b. The output signals 606a and 606b are superimposed upon each other, resulting in a transmitted antenna beam 608 with a physical origin 610 located between the first and second antennas.

By adjusting the phase of the signals generated by the first and second transmission chains the transmitted antenna beam can be steered +/−90° with respect to the azimuth. For example, at a first time period (t=1) the first transmission chain 602a generates an output signal having an amplitude of $A_{1,1}$ and a phase of $_{1,1}$ and the second transmission chain generates an output signal having an amplitude of $A_{2,1}$ and a phase of $_{2,1}$, resulting in a transmitted antenna beam having a first angle Φ with respect to the azimuth. By adjusting the first transmission chain 602a to generate an output signal having an amplitude of $A_{1,2}$ and a phase of $_{1,2}$ and the second transmission chain 602b to generate an output signal having an amplitude of $A_{2,2}$ and a phase of $_{2,2}$ the angle of the transmitted antenna beam can be adjusted to have a second angle $Φ_2$ with respect to the azimuth at a second time period (t=2).

Referring to FIG. 6b, the DBF radar transmitter 612 is operated according to a second active transmission chain subset configuration wherein the first transmission chain 602a and the third transmission chain 602c are active, while the second transmission chain 602b is inactive. The first and third transmission chains output signals 606a and 606c from the first and third antennas 604a and 604c. The output signals 606a and 606c are superimposed upon each other, resulting in a transmitted antenna signal having a physical origin 610 located between the first and third antennas.

By adjusting the phase of the signals generated by the first and second transmission chains the transmitted antenna beam can be steered +/−90° with respect to the azimuth. For example, at a first time period (t=1) the first transmission chain 602a generates an output signal having an amplitude of $A_{1,1}$ and a phase of $_{1,1}$ and the third transmission chain generates an output signal having an amplitude of $A_{3,1}$ and a phase of $_{3,1}$, resulting in a transmitted antenna beam having a first angle $Φ_1$ with respect to the azimuth. By adjusting the first transmission chain 602a to generate an output signal having an amplitude of $A_{1,2}$ and a phase of $_{1,2}$ and the third transmission chain 602c to generate an output signal having an amplitude of $A_{3,2}$ and a phase of $_{3,2}$ the angle of the transmitted antenna beam can be adjusted to have a second angle $Φ_2$ with respect to the azimuth at a second time period (t=2).

An additional radiation position can be realized by activating the first and third transmission chains, while deactivating the second transmission chain. In such a configuration the radiation position would be between locations.

Figure 7:
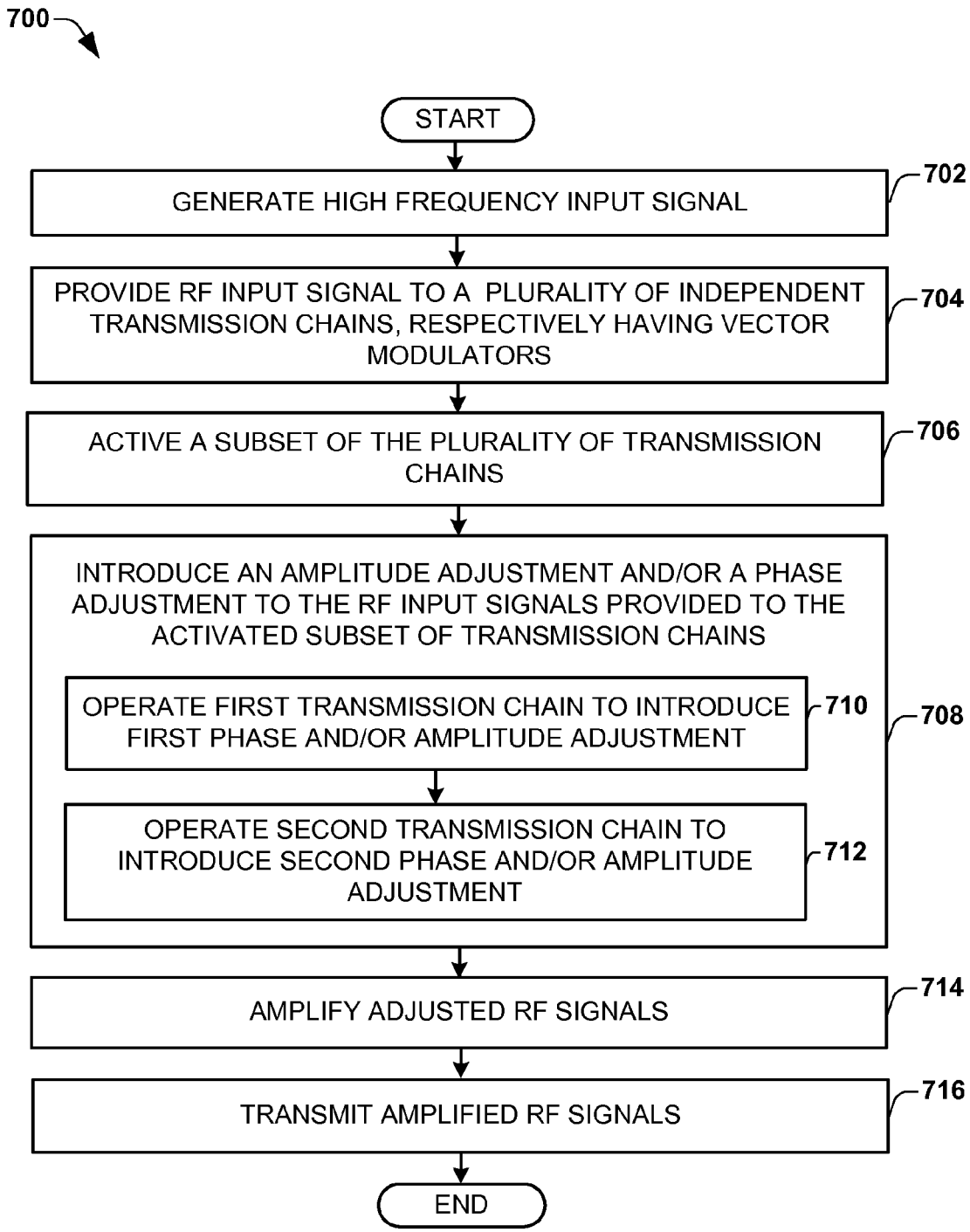
FIG. 7 is a flow diagram of an exemplary method for generating a transmitted radar beam.

FIG. 7 is a flow diagram of a more detailed exemplary method 700 for generating a steerable transmitted radar beam with a changeable origin.

While methods are illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

Furthermore, the claimed subject matter may be implemented as a method, apparatus, or article of manufacture using standard programming and/or engineering techniques to produce software, firmware, hardware, or any combination thereof to control a computer to implement the disclosed subject matter (e.g., the circuits shown in FIGS. 1, 2, etc., are non-limiting examples of circuits that may be used to implement method 700). The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

At 702 a high frequency signal is generated. The high frequency may comprise an RF input signal (e.g., having a frequency of approximately 24 GHz). In one embodiment, the high frequency input signal may be generated by a local oscillator.

At 704 the high frequency input signal is provided to a plurality of transmission chains, wherein respective transmission chains have a vector modulator. In one embodiment, a buffer amplifier amplifies the RF signal before providing it to a power splitter that splits the received RF signal and output the split RF signal to a plurality of independent transmission chains. In an alternative embodiment, a buffer amplifier amplifies the RF signal before the output of the buffer amplifier is provided directly to the separate transmission chains.

At 706 a subset of the plurality of transmission chains of a radar transmitter is activated. In one embodiment, the subset comprises two or more transmission beams, which when operated concurrently enable a beam steering functionality. Furthermore, the subset defines a location of an origin of the transmitted antenna beam. For example, if a first subset is activated a transmitter radar beam is formed from an origin having a first location, while if a second subset is activated a transmitter radar beam is formed from an origin having a second location different than the first location. In one embodiment, activating a subset of the plurality of transmission chains, comprises selectively providing a bias voltage to power amplifiers located within respective transmission chains.

At 708 separate amplitude and/or phase adjustments are introduced into the RF signal input into the activated subset of the plurality of transmission chains to generate a plurality of RF output signals. For example, in one embodiment, a first transmission chain may comprise a first vector modulator configured to introduce a first amplitude and/or a first phase adjustment into the RF input signal (step 710), while a second transmission chain may comprise a second vector modulator configured to introduce a second amplitude and/or a second phase adjustment into the RF input signal (step 712), wherein the second amplitude adjustment is different than the first and wherein the second phase adjustment is different than the first.

In another more particular embodiment, wherein the vector modulator comprises one or more IQ mixers introducing an amplitude and/or phase adjustment to the RF input signal may be accomplished by first separating the RF input signal into an in-phase and a quadrature phase RF input signal having a 90° phase offset therebetween. An in-phase control signal is mixed with the in phase RF input signal to generate a modulated in phase signal. A quadrature phase control signal is mixed with the quadrature phase RF input signal to generate a modulated quadrature signal. The modulated in-phase signal and the modulated quadrature phase signal are combined to generate an RF output signal.

At 714 the amplitude of the RF output signals is amplified. In one embodiment the RF output signal may be amplified by a power amplifier coupled to the output of the vector modulator.

At 716 the amplified RF output signals are transmitted from antennas corresponding to the activated subset of transmission chains.

It will be appreciated that the methods and apparatus provide herein may be utilized in a wide range of applications. For example, in one embodiment the DBF radar transmitter may be comprised within an automobile, as part of an adaptive cruise control (ACC) system. In alternative embodiments, the DBF radar transmitter may be comprised within other vehicles (e.g., trains, boats, etc.) or within other applications (e.g., blind-spot detection (BSD), and lane-change assist (LCA), etc.).

Although the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A transmitter, comprising:
   a plurality of independent transmission chains configured to receive an RF input signal, wherein respective independent transmission chains comprise a vector modulator configured to independently introduce an amplitude adjustment or a phase adjustment to the RF input signal; and
   a control unit configured to independently activate and deactivate the plurality of independent transmission chains, such that a subset of the plurality of transmission chains is activated to concurrently operate to generate a transmitted signal;
   wherein the plurality of independent transmission chains comprise:
   a first transmission chain comprising a first vector modulator configured to introduce a first amplitude adjustment or a first phase adjustment into the RF input signal; and
   a second transmission chain comprising a second vector modulator configured to introduce a second amplitude adjustment, different than the first amplitude adjustment, or a second phase adjustment, different than the first phase adjustment, into the RF input signal.

2. The transmitter of claim 1, wherein the transmitter is comprised within a single integrated chip substrate.

3. The transmitter of claim 2, wherein the single integrated chip substrate comprises a silicon substrate.

4. The transmitter of claim 1, wherein the subset of the plurality of independent transmission chains comprises two or more of the plurality of independent transmission chains.

5. The transmitter of claim 1, wherein the transmitted signal comprises a transmitted radar beam, the transmitter further comprising:
   a plurality of switching elements configured to selectively activate and deactivate the plurality of independent transmission chains based on a control signal received from the control unit in a manner that moves a location of the origin of the transmitted radar beam.

6. The transmitter of claim 1, further comprising a signal generator configured to generate the RF input signal and provide such RF input signal to the plurality of independent transmission chains.

7. The transmitter of claim 1, wherein the vector modulator comprises:
   a controller configured to generate one or more control signals; and
   one or more IQ mixers configured to introduce the amplitude adjustment or the phase adjustment to the RF input signal based upon the one or more control signals.

8. The transmitter of claim 1, wherein the first and second vector modulators respectively comprise:
   a signal splitter configured to separate the RF input signal into an in-phase RF input signal and a quadrature phase RF input signal;
   a controller configured to generate an in-phase control signal and a quadrature phase control signal having a 90° phase shift therebetween;
   a first IQ mixer configured to mix the in-phase RF input signal with the in-phase control signal to generate a modulated in-phase signal;
   a second mixer configured to mix the quadrature phase RF input signal with the quadrature phase control signal to generate a modulated quadrature phase signal; and an adder configured to combine the modulated in-phase signal and the modulated quadrature phase signal to generate an RF output signal.

9. The transmitter of claim 1, wherein the plurality of independent transmission chains respectively comprise:
a power amplifier configured to adjust the amplitude of an RF output signal generated by the vector modulator.

10. The transmitter of claim 9, further comprising:
a power supply configured to selectively provide a bias voltage to the power amplifier, wherein each independent transmission chain is activated or deactivated by controlling the bias to voltage provided to the power amplifier.

11. A transmitter, comprising:
a single integrated chip comprising:
a plurality of independent transmission chains configured to receive an RF input signal, wherein respective independent transmission chains comprise:
a vector modulator including one or more IQ mixers configured to introduce an amplitude adjustment or a phase adjustment to the RF input signal; and
a control unit configured to independently activate and deactivate the plurality of independent transmission chains, such that a subset of the plurality of independent transmission chains are concurrently activated to generate a transmitted signal;
wherein the subset of the plurality of independent transmission chains define a location of an origin of the transmitted signal.

12. The transmitter of claim 11, further comprising:
a plurality of switching elements configured to selectively activate and deactivate the plurality of transmission chains based on a control signal received from the control unit in a manner that moves a location of the origin of the transmitted signal.

13. The transmitter of claim 11, wherein the plurality of independent transmission chains comprise:
a first transmission chain comprising a first vector modulator configured to introduce a first amplitude adjustment or a first phase adjustment into the RF input signal; and
a second transmission chain comprising a second vector modulator configured to introduce a second amplitude adjustment, different than the first amplitude adjustment, or a second phase adjustment, different than the first phase adjustment, into the RF input signal.

14. The transmitter of claim 13, wherein the first vector modulator and the second vector modulator, respectively comprise:
a signal splitter configured to separate the RF input signal into an in-phase RF input signal and a quadrature phase RF input signal;
a controller configured to generate an in-phase control signal and a quadrature phase control signal having a 90° phase offset therebetween;
a first IQ mixer configured to mix the in-phase RF input signal with the in-phase control signal to generate a modulated in-phase signal;
a second mixer configured to mix the quadrature phase RF input signal with the quadrature phase control signal to generate a modulated quadrature phase signal; and
an adder configured to combine the modulated in-phase signal and the modulated quadrature phase signal to generate an RF output signal.

15. The transmitter of claim 11, further comprising:
a signal generator configured to generate the RF input signal and provide such RF input signal to the plurality of independent transmission chains.

16. A method for generating a transmitted signal, comprising:
providing an RF input signal to a plurality of transmission chains, wherein respective transmission chains have a vector modulator;
activating a subset of the plurality of transmission chains to define a location of a transmitted radar beam,
introducing separate phase adjustments to the RF input signal provided to the subset of the plurality of transmission chains to generate a plurality of RF output signals by:
operating a first activated transmission chain to introduce a first amplitude adjustment or a first phase adjustment into the RF input signal; and
operating a second activated transmission chain to introduce a second amplitude adjustment, different than the first amplitude adjustment, or a second phase adjustment, different than the first phase adjustment, into the RF input signal; and
transmitting the plurality of RF output signals from antennas corresponding to the subset of the plurality of transmission chains.

17. The method of claim 16, further comprising generating the RF input signal and providing such RF input signal to the plurality of transmission chains.

18. The method of claim 16, wherein introducing separate phase adjustments, comprises:
separating the RF input signal into an in-phase RF input signal and a quadrature phase RF input signal;
generating an in-phase control signal and a quadrature phase control signal having a 90° phase offset therebetween;
mixing the in-phase RF input signal with the in-phase control signal to generate a modulated in-phase signal;
mixing the quadrature phase RF input signal with the quadrature phase control signal to generate a modulated quadrature phase signal; and
combining the modulated in-phase signal and the modulated quadrature phase signal to generate an RF output signal.

19. The method of claim 16, wherein activating a subset of the plurality of transmission chains, comprises:
selectively providing a bias voltage to power amplifiers located within respective transmission chains.

* * * * *